United States Patent [19]
Labaziewicz

[11] Patent Number: 5,255,048
[45] Date of Patent: Oct. 19, 1993

[54] CAMERA WITH EXPOSURE-CONTROLLED PSEUDO-TELEPHOTO MODE AND METHOD OF OPERATION

[75] Inventor: Peter Labaziewicz, Rochester, N.Y.

[73] Assignee: Eastman Kodak Company, Rochester, N.Y.

[21] Appl. No.: 964,698

[22] Filed: Oct. 22, 1992

[51] Int. Cl.$^5$ .................... C03B 5/00; C03B 15/03; C03B 17/24
[52] U.S. Cl. .................... 354/419; 354/106; 354/195.1
[58] Field of Search ............ 354/419, 105, 106, 195.1, 354/195.12

[56] References Cited

U.S. PATENT DOCUMENTS

| | | | |
|---|---|---|---|
| 4,290,679 | 9/1981 | Vockenhuber | 354/195.1 X |
| 4,733,263 | 3/1988 | Taniguchi et al. | 354/419 |
| 4,870,439 | 9/1989 | Tsuboi et al. | 354/195.12 X |
| 4,943,825 | 7/1990 | Taniguchi et al. | 354/106 X |
| 4,963,907 | 10/1990 | Inoue et al. | 354/106 X |
| 5,003,340 | 3/1991 | Harvey | 354/106 X |

Primary Examiner—W. B. Perkey
Attorney, Agent, or Firm—David Hall

[57] ABSTRACT

A photographic camera with a pseudo-telephoto mode of operation, a flash unit, and a picture taking lens that can be set at a plurality of focal lengths includes a controller that responds to a low-light condition by activating the flash unit, positioning the picture taking lens at a reduced available lens focal length than that selected by the user, and by placing the camera in a pseudo-telephoto mode, in which a frame image from the picture taking lens is designated as a pseudo-telephoto frame. The reduced focal length provides a lens setting with increased light-gathering ability. The focal length selected by the controller can provide a print that, in combination with pseudo-telephoto processing, will provide a print with a relative magnification approximately equal to a print that otherwise would be provided from the lens focal length setting initially selected by the camera user.

9 Claims, 3 Drawing Sheets

CAMERA WITH EXPOSURE-CONTROLLED PSEUDO-TELEPHOTO MODE AND METHOD OF OPERATION

1. FIELD OF THE INVENTION

This invention relates generally to photographic cameras and, more particularly, to cameras that include a multiple focal length lens and that can be operated in a pseudo-telephoto mode.

2. DESCRIPTION OF THE RELATED ART

It is desirable to provide a camera that can produce photographic images of varying relative magnification because users often want to emphasize different portions of a scene and want to use the additional flexibility in composing photographs. For this purpose, many cameras are equipped with adjustable focal length lenses that can be set to a minimum focal length, or wide angle setting, and a maximum focal length, or telephoto setting. The wide angle setting provides a photographic image that takes in the greatest extent of the scene and the telephoto setting provides a photographic image that is magnified, or enlarged, relative to the wide angle image. Alternatively, cameras can be provided with a so-called pseudo-telephoto mode of operation in which the magnification of the photographic image formed by the picture taking lens is not altered, rather, magnification takes place during printing.

Using the pseudo-telephoto mode, a film frame is designated as a pseudo-telephoto frame when it is exposed. Part of the film image is masked off, either during exposure in the camera or during printing after development, to provide a print with the proper height-to-width ratio. That is, for a given camera lens focal length, the film image is no larger for an ordinary exposure than for a pseudo-telephoto frame and the desired magnification is provided during processing. A camera with pseudo-telephoto capability is advantageous because it is compact, light-weight, and less expensive when compared with other multi-focal length lens camera systems that produce photographic images of varying sizes.

In a camera with an adjustable focal length lens, the amount of light passing through the lens quickly decreases for a given lens aperture diameter as the lens focal length increases. Therefore, the reduced light transmission can result in under-exposed photographs. For example, in a camera with a maximum lens aperture of 7 mm, the amount of light transmitted at maximum aperture when the lens focal length is at 35 mm (a lens/aperture ratio commonly referred to as an f-stop of f/5) is twice the amount of light transmitted when the lens focal length is at 70 mm (a ratio commonly referred to as f/10). This change in light transmission might not be appreciated by all photographers, and photographs with incorrect exposure can be the result. It is especially easy for the unwary photographer to select a long focal length without realizing the extent to which light transmission has been reduced.

Flash units that provide artificial scene illumination can help prevent under-exposed photographs. The likelihood of accidental under-exposure would be decreased if a camera automatically controlled flash as a user selected various photographic modes. Automatic exposure systems can be used to adjust exposure and activate flash units when necessary, without intervention by the camera user. For example, U.S. Pat. No. 4,733,263 to Taniguchi et al. describes a camera that can operate in a user-selected pseudo-telephoto mode and that automatically controls exposure and activates a flash unit in accordance with the mode (normal, pseudo-telephoto) selected by the user.

Even with automatic exposure systems and flash units, accidentally under-exposed photographs still are possible, especially at longer lens focal length settings, where there is greatly reduced light transmission. Under some conditions, a user can obtain a properly exposed photograph by selecting a shorter focal length, thereby reducing the f/stop and increasing the light transmission, but this requires the user to be aware that there is insufficient light transmission at the longer focal length and that there is adequate light at the shorter focal length. Moreover, the shorter focal length will not provide the desired magnification.

If a camera has a pseudo-telephoto mode of operation, under some conditions it will be possible to select a shorter lens focal length and obtain the desired magnification at printing, but this again requires the user to be aware that there is insufficient light at the longer focal length and that there is adequate light at the shorter focal length, and further requires the user to realize that the desired magnification can be obtained at processing time through pseudo-telephoto mode. Thus, even with conventional auto-exposure system, it still is possible for the camera user to select a lens focal length in which a satisfactory exposure is not possible, without realizing that another mode providing a satisfactory exposure is available.

From the discussion above, it should be apparent that there is a need for an adjustable focal length camera that reduces the likelihood of accidentally under-exposed photographs when a user selects long focal lengths by automatically selecting a focal length and the pseudo-telephoto operation mode to provide increased light transmission and improved exposure. The present invention satisfies this need.

SUMMARY OF THE INVENTION

The present invention provides a photographic camera having a picture taking lens that can be positioned to a plurality of lens focal lengths, a lens focal length selector that can be operated by the camera user to select one of the lens focal lengths at which the user wants the picture taking lens to be positioned, and an exposure metering system that detects the amount of ambient light illuminating the scene and determines a low-light condition in which the detected ambient light is insufficient to provide a properly exposed photograph, the camera further including a controller that responds to a low-light condition by positioning the picture taking lens at a reduced available lens focal length than that selected by the user and placing the camera in a pseudo-telephoto mode, in which the image formed on the film frame from the picture taking lens is designated to be a pseudo-telephoto frame. That is, the camera will respond to exposure conditions by over-riding the lens focal length selected by the user to provide a reduced lens focal length setting with more light-gathering ability and selecting pseudo-telephoto mode to compensate at least in part for the reduced focal length. In this way, the exposure is made at a reduced f/stop number with more available light passing through the lens, thereby maximizing the likelihood of obtaining an acceptable exposure, and the exposed image is indicated as being a pseudo-telephoto frame, thereby providing a print that is magnified relative to the print that otherwise would be obtained from a conventional print. The user therefore does not have to be concerned with the available light and is free to compose photographs and select focal lengths as desired without worrying about underexposed prints.

In another embodiment, the present invention provides a camera that not only selects pseudo-telephoto mode when light conditions warrant it, as described above, but also selects a lens focal length that will provide a pseudo-telephoto frame that on printing will produce a print with a relative magnification approximately corresponding to a conventional print obtained from the lens focal length setting initially selected by the camera user. For example, if a pseudo-telephoto print provides a print image in which objects are twice the size of the corresponding objects in a conventional print from the same film frame, then the controller will select a lens focal length setting that is half the setting initially selected by the user whenever the controller determines that insufficient light is available and pseudo-telephoto mode is necessary. In this way, the user not only obtains a print that is not under-exposed, the user also obtains a print that approximately corresponds to the print that would have been provided by the focal length initially selected.

In another embodiment, the present invention provides a camera that selects pseudo-telephoto mode and a reduced lens focal length in response to low-light conditions, as described above, and further continues to select reduced focal length settings as long as they are available until there is sufficient light through the picture taking lens for proper exposure.

In any of the embodiments, the camera also can include a flash unit that can be activated to provide artificial scene illumination when the control system determines that additional illumination is necessary.

Other features and advantages of the present invention will become apparent from the following description of the preferred embodiments, which illustrate, by way of example, the principles of the invention.

DESCRIPTION OF THE PREFERRED EMBODIMENTS

Figure 1:
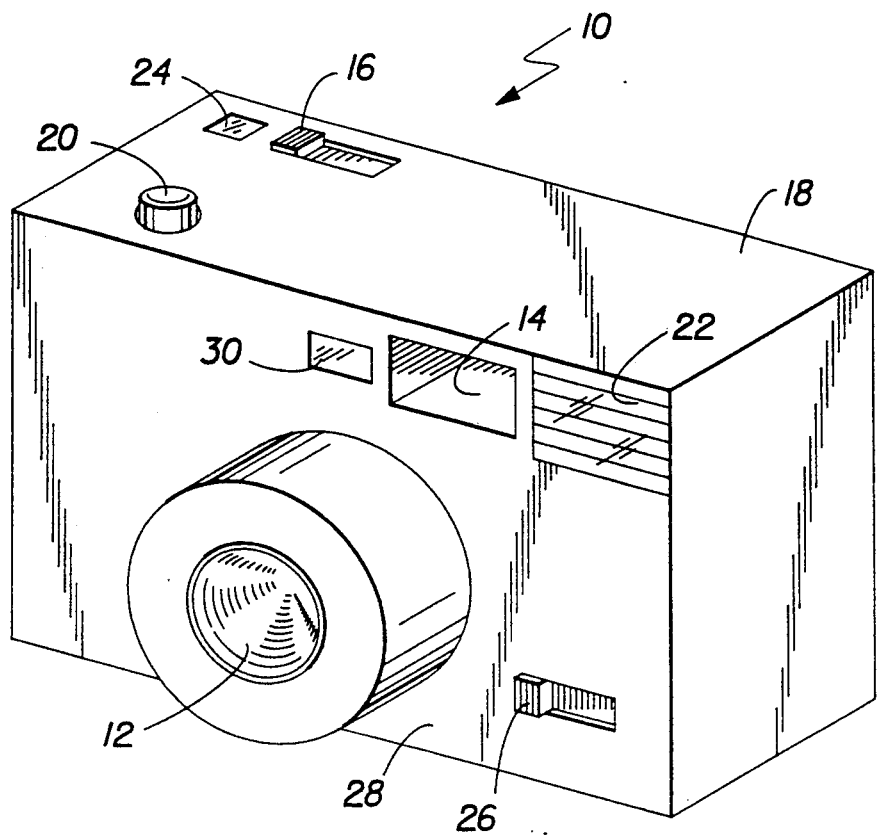
FIG. 1 is a perspective view of a camera that is constructed in accordance with the present invention.

FIG. 1 illustrates a camera 10 constructed in accordance with the present invention, in which the picture taking lens 12 of the camera is pointed at a photographic subject as the camera user looks through the camera viewfinder 14. The user can select a desired lens focal length by moving a lens selector switch 16 on the top surface 18 of the camera. The lens selector switch, for example, can select from a minimum focal length, a maximum focal length, or a number of intermediate focal length settings. When the user presses the shutter button 20 to make an exposure, if there is insufficient light available for the focal length selected by the user, the camera automatically selects a reduced available lens focal length setting, activates a flash unit 22 on the camera if necessary, and indicates a pseudo-telephoto frame when making the exposure. Thus, the exposure is made at a lower numerical f-stop ratio, which indicates that the exposure is made with a greater amount of transmitted light. When the print from the pseudo-telephoto frame is made, the resulting print will be brighter than if the lens focal length selected by the user was used and the camera user will obtain a properly exposed print with a magnified image, as desired. This helps prevent accidentally under-exposed photographs while providing the user with the magnified images desired.

The camera 10 further includes a frame counter 24 visible on the top surface 18 of the camera. If desired, the user can be given the option of affirmatively selecting the pseudo-telephoto mode of operation by moving a selector switch 26 located on the front surface 28 of the camera. Ordinarily, however, the user would select a suitable telephoto lens focal length via the lens setting switch 16 when enlarged images are desired rather than by selecting pseudo-telephoto operation and would let the camera make adjustments as needed according to exposure. In FIG. 1, the sensor windows 30 for the automatic exposure/light sensing system are visible on the camera front surface.

Figure 2:
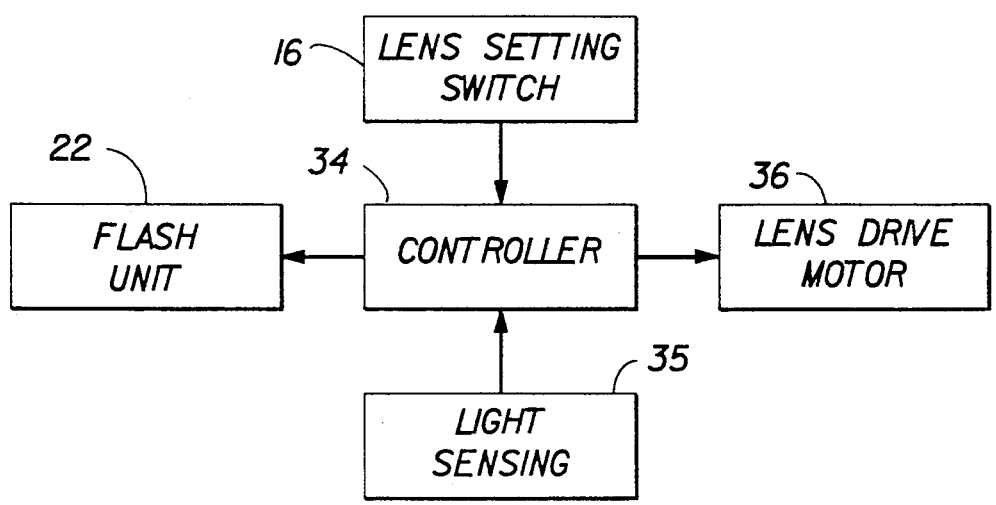
FIG. 2 is a functional block diagram of the camera shown in FIG. 1.

FIG. 2 illustrates the major functional blocks of the camera 10 and their relationships. As described above, the camera user selects a lens focal length via the lens focal length switch 16. The controller 34 receives the lens setting when the shutter button 20 (FIG. 1) is pressed and also receives light information from a light sensing system 35 via the auto-exposure sensor window 30. If the controller determines that insufficient light is available for a proper exposure given the lens setting selected by the user via the selector switch 16, then the controller selects an alternate shorter focal length setting, provides the alternate setting to a lens drive motor 36 that positions the lens 12, activates the flash unit 22, and provides a command to a pseudo-telephoto indication system 38 to indicate a pseudo-telephoto frame when making the exposure. The pseudo-telephoto indication can be provided, for example, by an optical mark on the edge of the film to indicate to the photographic printer that the frame should be processed as a pseudo-telephoto frame. Alternative pseudo-telephoto indication systems are well-known to those skilled in the art and are not further described herein.

In the preferred embodiment in accordance with the invention, the controller 34 selects a reduced lens focal length setting that, in combination with the pseudo-telephoto magnification at printing, provides approximately the same relative magnification as could have been provided by the focal length initially selected by the camera user. Such a system more closely provides the results desired by the user. Determining the focal length that should be selected, given the degree of magnification upon pseudo-telephoto printing, is well-known to those skilled in the art.

For example, if pseudo-telephoto printing provides a in which objects are twice the size of the corresponding objects in a conventional print from the same film frame, then the controller 34 will select a lens focal length that is one-half the focal length selected by the user when the controller determines that insufficient light is available and pseudo-telephoto mode is necessary. Similarly, if pseudo-telephoto printing provides a print with objects three times the size of corresponding objects in a conventional print, then the controller will select a lens focal length that is one-third the focal length selected by the user. In this way, the user not only obtains a print that is not under-exposed, the user also obtains a print that approximately corresponds to a conventional print that would have been obtained from the focal length initially selected.

The operation of the camera 10 will be described further with reference to the flow chart illustrated in FIG. 3, which shows the operating steps. The user initially selects a lens focal length at step 102 and presses the shutter button to begin the exposure process at step 104. At step 106, the controller determines if there is sufficient light for a proper exposure. If sufficient light exists, then the picture taking lens is positioned as selected by the user at step 108 and the exposure is made at step 109. If insufficient light is available, the controller selects a lens focal length shorter than that selected by the user at step 110, activates the flash unit at step 112, indicates that the frame will be a pseudo-telephoto frame at step 114, and positions the lens accordingly at step 116. In accordance with the invention, the controller can select a focal length that will provide a print approximately equal in relative magnification to the print that would have been provided by the focal length initially selected by the user. Such a selection, the details of which are described above, would be made at step 110.

Figure 4:
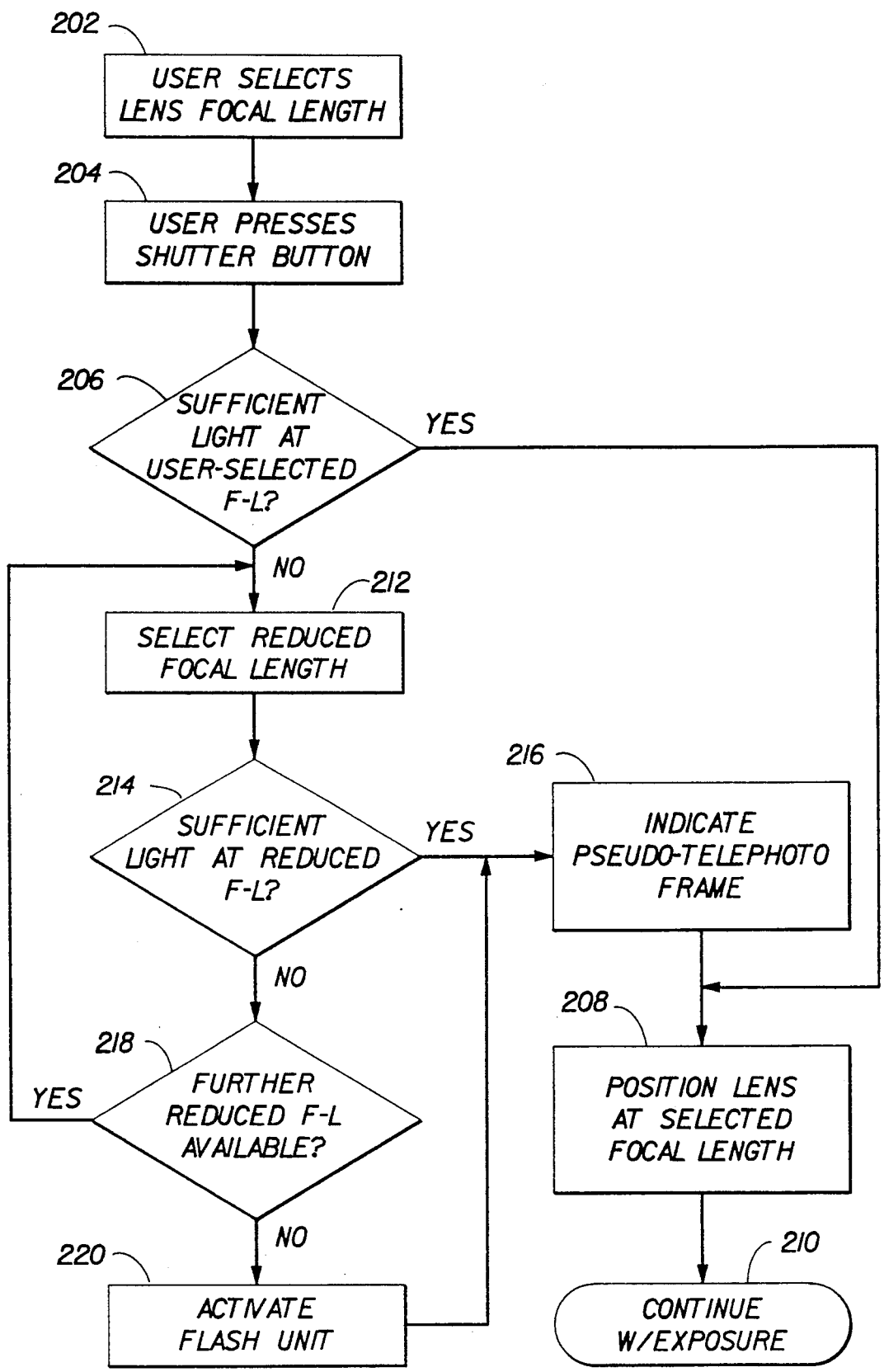
FIG. 4 is a flow chart that illustrates the operation of another camera embodiment in accordance with the invention.

FIG. 4 illustrates the operation of another camera constructed in accordance with the present invention. As with the earlier-described embodiments, a user initially selects a lens focal length (at step 202) and presses the camera shutter button (step 204). At step 206, the controller determines if there is sufficient light for a proper exposure. If sufficient light exists, then the picture taking lens is positioned as selected by the user at step 208 and the exposure is made at step 210. If insufficient light is available at the user-selected focal length, then at step 212 the controller selects a lens focal length setting that is less than that selected by the user. Next, at step 214, the controller checks to see whether sufficient light is available at the reduced setting for a proper exposure. If sufficient light is available, the pseudo-telephoto mode is indicated at step 216 and the lens is positioned at the selected focal length at step 208. The exposure is then continued at step 210. If the controller determines at step 214 that insufficient light is available even after selecting a reduced lens focal length setting, then the controller checks to see if a reduced focal length setting is available at step 218. That is, the controller checks to see whether the lower limit of the lens focal length settings has been reached. If no further reduced focal length settings are available, then the controller activates a flash unit at step 220 and then indicates pseudo-telephoto mode at step 214, positions the lens at the currently selected focal length setting at step 216, and continues with the exposure at step 210.

If a further reduced focal length setting is available at step 218, then the controller returns to step 212 to select the reduced focal length. The controller then repeats the process described above, checking to see if sufficient light for proper exposure is available at the further reduced focal length (step 214), continuing with the exposure if sufficient light is available (step 216), and checking to see if a further reduction in focal length is available otherwise (step 218). In this way, the FIG. 4 embodiment selects a reduced lens focal length setting depending on the lighting conditions, whereas the FIG. 3 embodiment selects a reduced focal length setting depending on the magnification indicated by the user.

Figure 3:
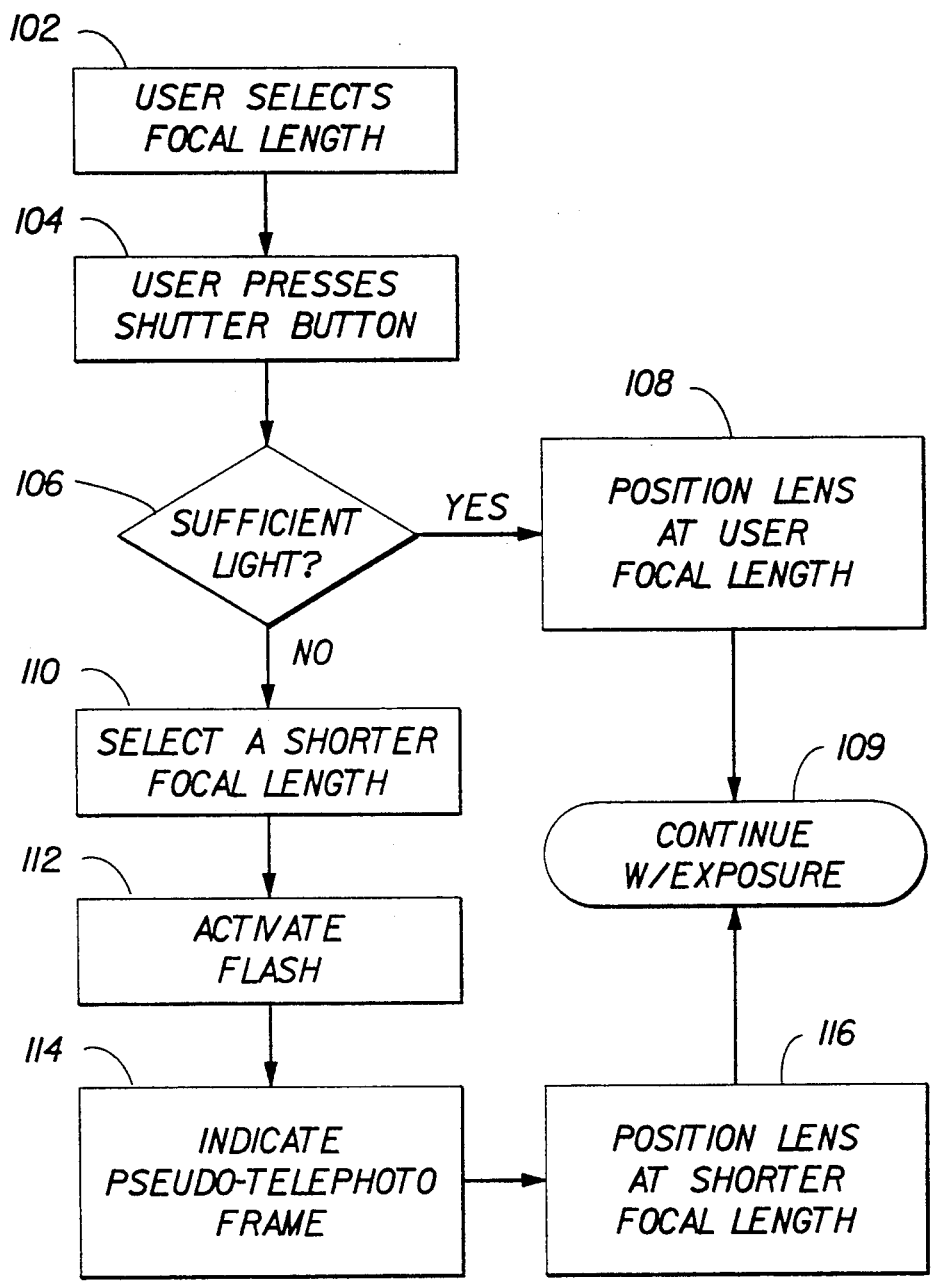
FIG. 3 is a flow chart that illustrates the operation of the camera shown in FIG. 1.

It should be understood that a camera in accordance with the invention could be provided with the lens focal length selection criteria described by both of the embodiments illustrated in FIG. 3 and FIG. 4. For example, the pseudo-telephoto selector 26 discussed above in conjunction with FIG. 1 could select between a magnification-dependent mode and a lighting condition-dependent mode rather than between normal mode and pseudo-telephoto mode. The magnification-dependent mode would operate in accordance with FIG. 3 and the lighting condition-dependent mode would operate in accordance with FIG. 4.

Thus, the present invention provides a multi-focal length photographic camera that determines when the lens focal length selected by the camera user will not provide an adequate exposure given the film speed and available light, and that in response selects a reduced focal length and changes to a pseudo-telephoto mode of operation that, in combination with pseudo-telephoto processing, will result in a print having a relative magnification approximately equal to a conventional print that would have been obtained from the lens focal length setting initially selected by the camera user. In this way, the camera advantageously uses exposure to somewhat control the lens setting and mode of operation, without intervention required by the user, to provide the best printed images possible and make use of all the light-gathering abilities of the camera lens.

The present invention has been described above in terms of presently preferred embodiments so that an understanding of the present invention can be conveyed. There are, however, many configurations for multi-focal length, pseudo-telephoto mode cameras not specifically described herein, but with which the present invention is applicable. The present invention therefore should not be seen as limited to the particular embodiments described herein, but rather, it should be understood that the present invention has wide applicability with respect to multi-focal length, pseudo-telephoto cameras in a variety of applications. All modifications, variations, or equivalent arrangements that are within the scope of the attached claims therefore should be considered to be within the scope of the invention.

I claim:

1. A photographic camera for taking photographs of a scene, the camera having a picture taking lens that can be positioned to a plurality of lens focal lengths, a lens selection means for operation by the camera user to select one of the lens focal lengths at which the user wants the picture taking lens to be positioned, and a light sensing system that detects the amount of ambient light illuminating the scene and determines a low-light condition in which the detected ambient light is insufficient to provide a properly exposed photograph, the camera further including:

controller means responsive to a low-light condition for positioning the picture taking lens at a reduced available lens focal length compared to that selected by the user and for placing the camera in a pseudo-telephoto mode, in which mode an image from the picture taking lens that is formed on a film frame is indicated as being a pseudo-telephoto frame.

2. A photographic camera as defined in claim 1, wherein the lens focal length selected by the controller means provides an exposed frame that, in combination with pseudo-telephoto processing, will provide a print with a relative magnification approximately equal to a print that otherwise would be provided from the lens focal length setting initially selected by the camera user.

3. A photographic camera as defined in claim 1, further including a flash unit that can be activated to provide artificial scene illumination, wherein the controller activates the flash unit in response to a low-light condition.

4. A photographic camera that can be operated in a normal photography mode and a pseudo-telephoto photography mode for making a photographic exposure of a scene, the camera comprising:
   a picture taking lens having a plurality of lens focal lengths;
   lens focal length selector means, operable by the camera user, for selecting a lens focal length;
   light-sensing means for detecting the amount of ambient light illuminating the scene;
   exposure means for producing an insufficient light signal when the ambient light detected by the light-sensing means is insufficient to provide a properly exposed exposure;
   a flash unit that can be activated to provide artificial scene illumination; and
   control means responsive to the insufficient light signal for selecting a reduced available lens focal length than that indicated by the lens focal length selector means and placing the camera in the pseudo-telephoto photography mode of operation, and for activating the flash unit.

5. A photographic camera as defined in claim 4, wherein the lens focal length selected by the control means provides an exposed frame that, in combination with pseudo-telephoto processing, will provide a print with a relative magnification approximately equal to a print that otherwise would be provided from the lens focal length setting initially selected by the camera user.

6. A photographic camera comprising:
   a picture taking lens that can be positioned at a plurality of lens focal lengths;
   a lens selection switch, operable by the camera user, for selecting a lens focal length at which the picture taking lens will be positioned;
   light-sensing means for detecting the amount of ambient light illuminating the scene;
   exposure means for producing an insufficient light signal when the ambient light detected by the light-sensing means is insufficient to provide a properly exposed exposure;
   a flash unit that can be activated to provide artificial scene illumination;
   mode select means responsive to a command signal for selecting between a normal photography mode, in which a scene image from the picture taking lens is formed on a film frame, and a pseudo-telephoto photography mode, in which an image from the picture taking lens that is formed on a film frame is indicated as being a pseudo-telephoto frame; and
   control means for receiving the insufficient light signal and for responding to the insufficient light signal by positioning the picture taking lens at a shorter available lens focal length than that indicated by the lens selection switch, producing the command signal such that the mode select means selects the pseudo-telephoto mode, and activating the flash unit.

7. A method of making photographic exposures in a camera having a picture taking lens that can be set at a plurality of focal lengths and being capable of a pseudo-telephoto mode of operation, comprising the steps of:
   receiving a desired lens focal length setting selected by the camera user;
   determining if sufficient light is available at the selected lens focal length through the picture taking lens for making a proper exposure;
   selecting a reduced available lens focal length than that selected by the camera user if insufficient light is available, and selecting the pseudo-telephoto mode of operation to compensate at least in part for the reduced lens focal length selection.

8. The method as defined in claim 7, wherein the step of selecting a shorter lens focal length includes the step of selecting a lens focal length that will provide a printed image that approximately corresponds to the image that would otherwise have been provided by the lens focal length initially selected by the camera user.

9. The method as defined in claim 7, wherein the step of selecting a reduced available lens focal length include the steps of:
   determining if sufficient light is available through the picture taking lens for making a proper exposure;
   selecting a further reduced lens focal length if one is available and continuing with operation; and
   activating a flash unit if no further reduced lens focal length is available.

* * * * *